(12) United States Patent
Penney

(10) Patent No.: US 6,338,419 B1
(45) Date of Patent: Jan. 15, 2002

(54) CONTAINER

(76) Inventor: Grace S. Penney, 424 Narcissus Ave., Corona del Mar, CA (US) 92625

( * ) Notice: Subject to any disclaimer, the term of this patent is extended or adjusted under 35 U.S.C. 154(b) by 0 days.

(21) Appl. No.: 09/349,289

(22) Filed: Jul. 7, 1999

(51) Int. Cl.[7] .............................................. B65D 25/22
(52) U.S. Cl. ..................................................... 220/475
(58) Field of Search .......................... 220/475, 35, 41, 220/37; 73/311.2, 45.6

(56) References Cited

U.S. PATENT DOCUMENTS

| | | | | |
|---|---|---|---|---|
| 2,017,245 A | * | 10/1935 | Hertzberg | 220/475 |
| 3,255,913 A | * | 6/1966 | Helm | 220/475 |
| 3,952,906 A | * | 4/1976 | Georgopulos | 220/475 |
| 4,334,642 A | * | 6/1982 | Reisch | 220/475 |
| 4,596,370 A | * | 6/1986 | Adkins | 224/425 |
| 5,170,658 A | * | 12/1992 | Thayer | 224/425 |
| 5,299,720 A | * | 4/1994 | Koch, III | 224/425 |

FOREIGN PATENT DOCUMENTS

| | | | | |
|---|---|---|---|---|
| FR | 786570 | * | 9/1935 | 220/478 |

* cited by examiner

*Primary Examiner*—Joseph M. Moy
(74) *Attorney, Agent, or Firm*—J. Mark Holland

(57) ABSTRACT

A container for connection to pole. The container includes a receptacle and a releasable clamp. The releasable clamp has a C-shape and is integrally molded with the receptacle of a shape memory material. The arms of the C-clamp deflect outwardly to allow the container to be attached onto the pole in a direction that is transverse to the pole axis. When the arms surround the pole, they produce a frictional force that holds the container in position along the pole.

9 Claims, 5 Drawing Sheets

CONTAINER

BACKGROUND OF THE INVENTION

1. Field of the Invention

This invention generally relates to containers for lawn, garden and household use and more particularly to containers adapted for use with patio furniture.

2. Description of Related Art

Containers for lawn, garden and household use and particularly for use with patio furniture can take many forms, such as vases for plants and flowers, cup holders, utensil holders and the like. Each specific container generally is a free-standing container with a receptacle for resting on a flat surface. The receptacle might be water-tight to carry plants or flowers in a liquid. Alternatively, the receptacle might be adapted for carrying other items, such as eating utensils and other items. When such a container is placed on a table with limited area, particularly as is encountered with patio furniture tables, the container and its contents can cover a significant portion of the table, often to the exclusion of other items, such as serving dishes, place settings and the like used for entertaining. When such a container is used as a vase, the use of such space may, in fact, lead to the omission of the flowers even though they would make an attractive addition.

Certain patio furniture, particularly patio tables and chairs, include an umbrella mounted on top of a pole that, in turn is positioned through the center of the table or the arm of a chair. Different types of containers have been proposed that are adapted for use in such situations. For example, U.S. Letters Patent No. DES 386,114 to Carson, discloses a tree collar planter. The planter has an annular shape, but terminates to provide a radial slot to a center opening. It appears that this planter is designed to sit on the ground around a tree trunk and that the radial slot can be expanded to spread to allow the planter to be slipped around a tree and then repositioned manually around the tree.

United States Letters Patent No. DES 351,121 to Lauchlan discloses a vase for an umbrella table in which the vase has an annular form. A center opening apparently receives the umbrella pole, but seems to require that the vase be slipped over a free end of the umbrella pole.

United States Letters Patent No. DES 400,823 to Bagshaw discloses an umbrella support plant pot with a cylindrical receptacle and a central, axially extending tube to form an annular planting portion. It would appear that this plant pot can only be inserted over the free end of an umbrella pole.

Each of the containers disclosed in the Carson, Lauchlan and Bagshaw patents rests on a horizontal support surface like a table. In such use, each would occupy space on the table unnecessarily. In certain applications, the annular nature of the receptacle can lead to the use of such a receptacle. For example, an attractive arrangement of flowers around an annular container as disclosed in each of those patents can be more difficult to achieve than in a normal cylindrical vase. Finally, the Lauchlan and Bagshaw patents disclose vases that must be inserted over the free end of a pole. There is no way to insert these while the pole is in place and in use.

SUMMARY

Therefore it is an object of this invention to provide a container that can be supported above a table surface.

Another object of this invention is to provide a container that can be supported above a table surface on a pole.

Yet another object of this invention is to provide a container that can attach to a pole and an umbrella table.

Still another object of this invention is to provide a container for attachment to an umbrella table pole that is easy to use.

Still yet another object of this invention is to provide a container for attachment to an umbrella table pole that is easy to manufacture.

In accordance with this invention, a container for attachment to a pole includes a receptacle with an exterior wall and a releasable clamp on the exterior of the receptacle. The releasable clamp has a passage that passes transversely onto the pole and fixes the container at a selected position along the pole.

In accordance with another aspect of this invention, a container for attachment to a vertical pole of a given diameter comprises a frustoconical receptacle having a closed end, an open end and being bounded by an exterior wall. An integrally molded, releasable clamp attaches to a portion of a receptacle. The clamp has first and second deflectable, arcuate arm portions terminating in counterfacing, spaced free ends defining a passage that is narrower than the diameter of the pole. The arms define a C-clamp structure having a diameter that is also less than the pole diameter. Each of the free ends deflect to increase the passage size and enable the C-clamp to encircle the pole whereupon the arms return toward an original position to clamp the container on the pole.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3 is a front elevation view of the container shown in. FIG. 1;

DESCRIPTION OF ILLUSTRATIVE EMBODIMENTS

Figure 1:
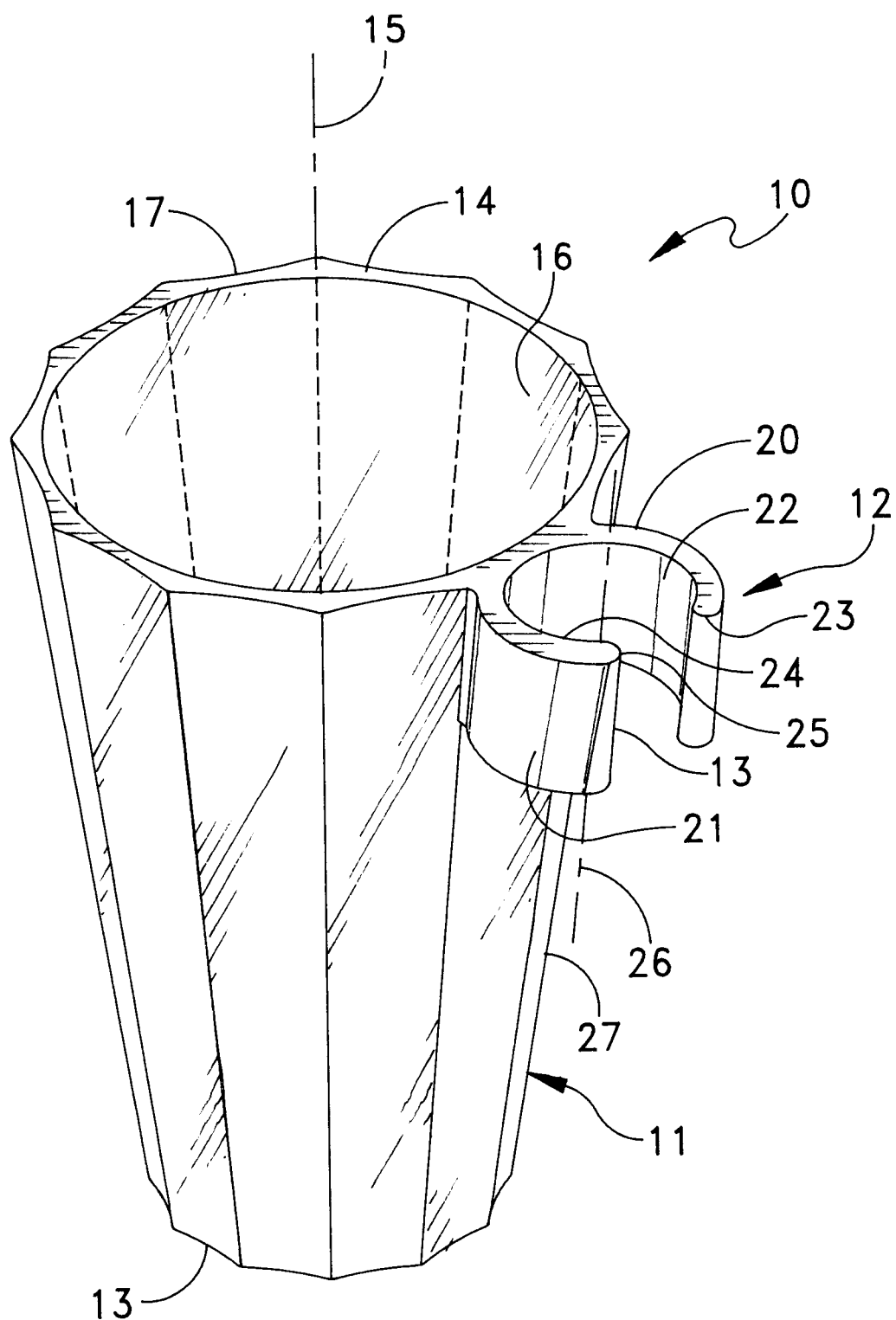
FIG. 1 is a perspective view of a container constructed in accordance with this invention.
Figure 2:
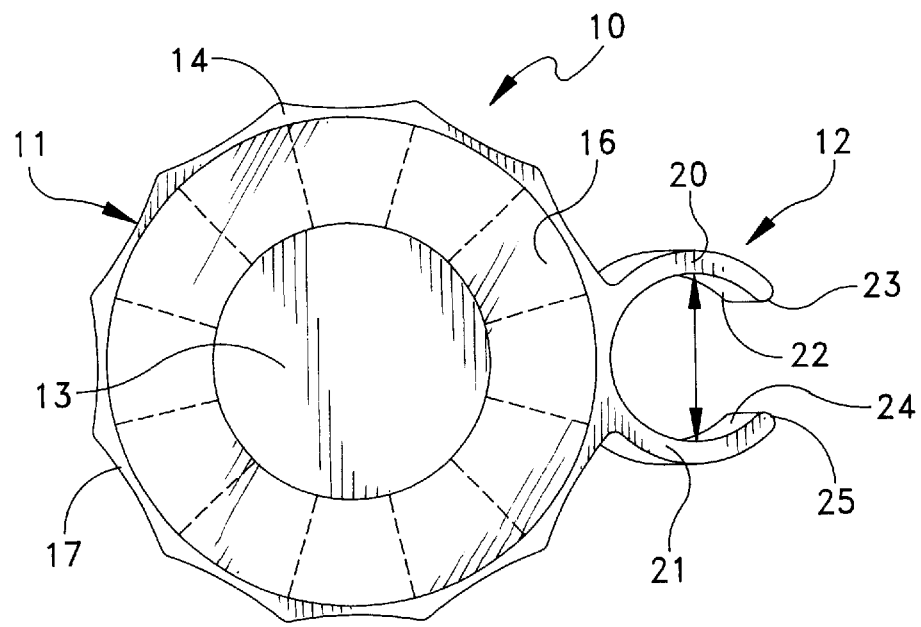
FIG. 2 is a top view plan view of the container shown in FIG. 1.
Figure 3:
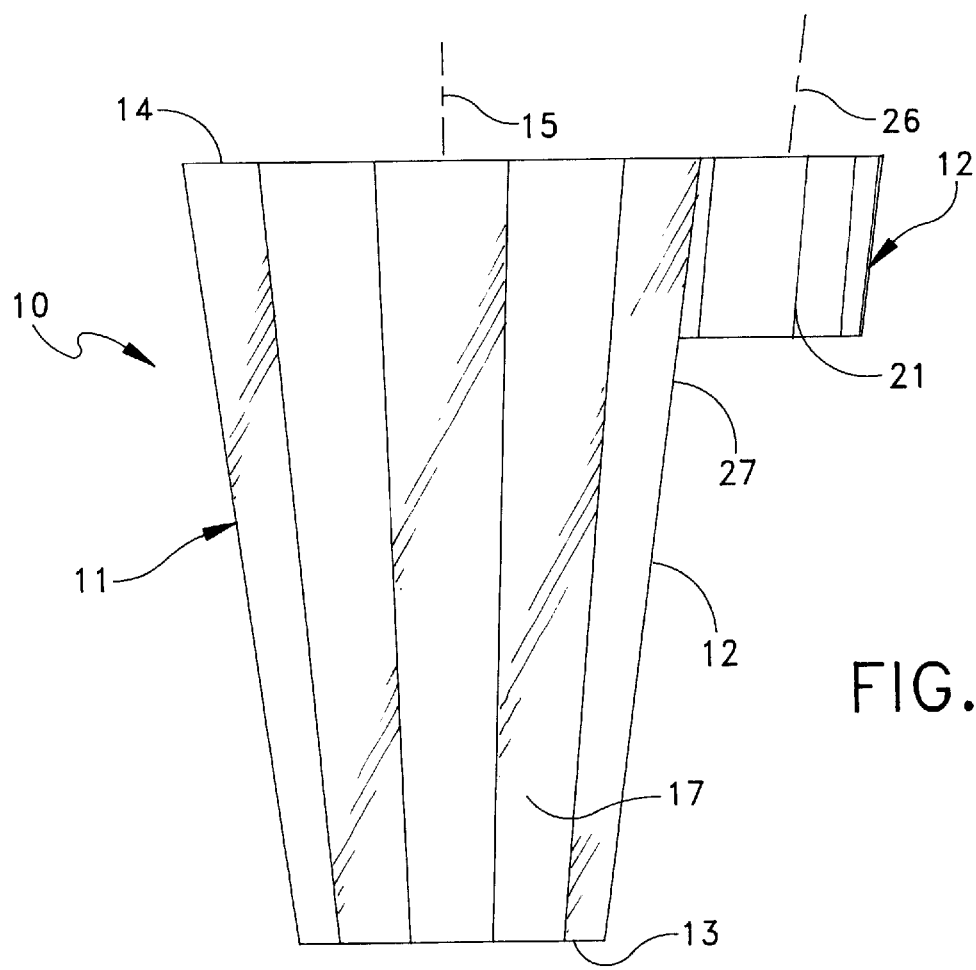
Figure 4A:
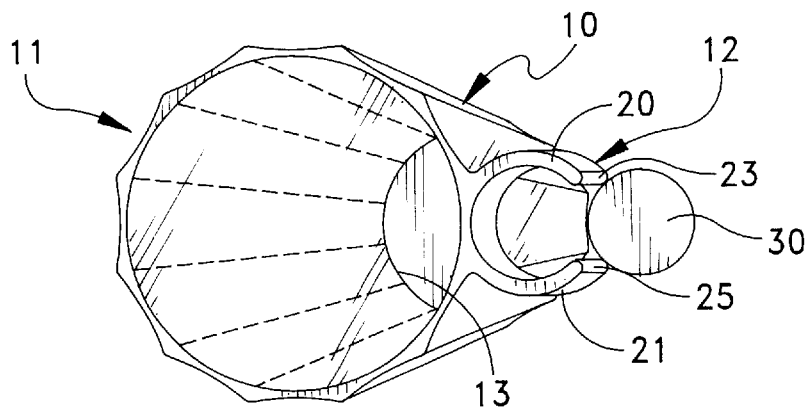
FIGS. 4A and 4B depict the container of FIGS. 1 through 3 adjacent a pole.
Figure 4B:
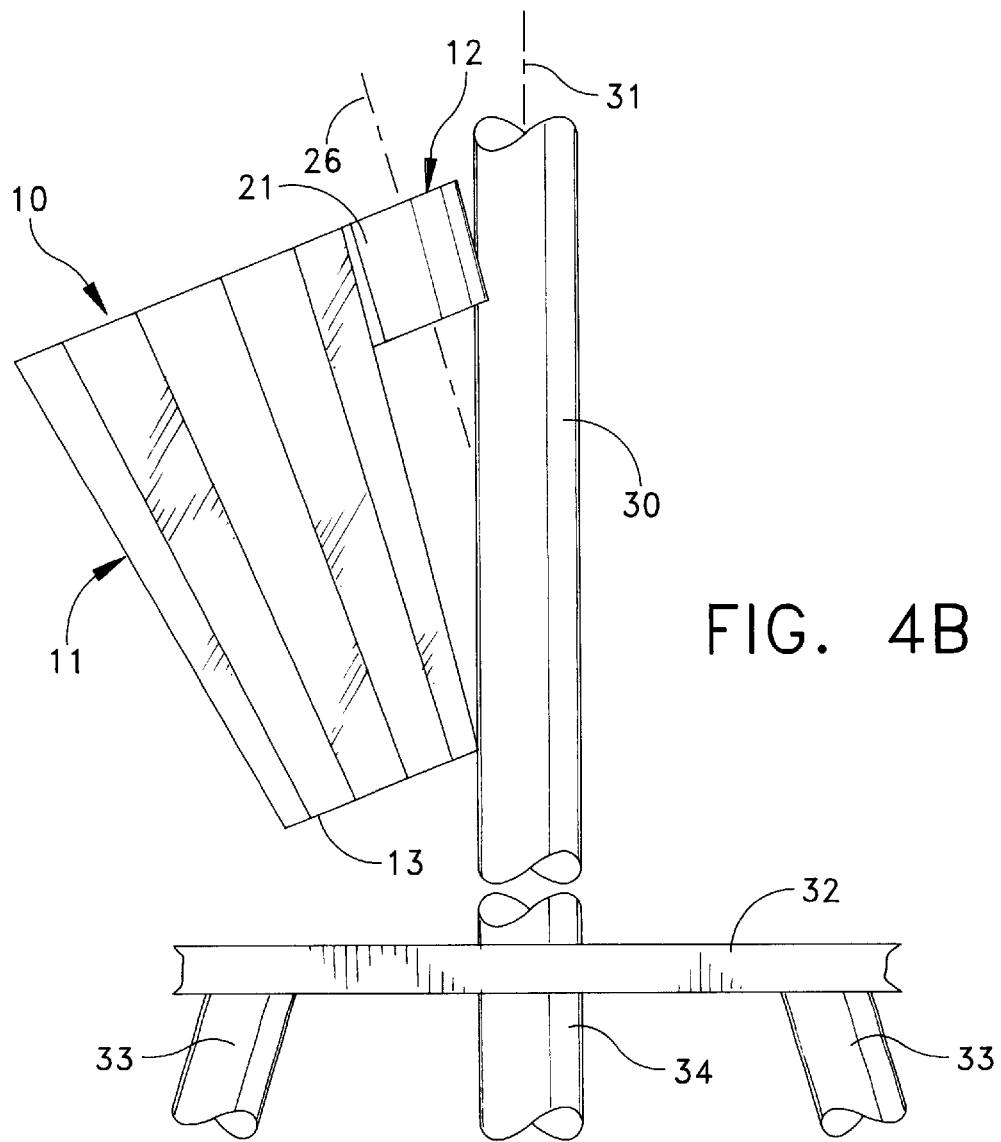

Now referring to FIGS. 1 through 3, a container 10, constructed in accordance with this invention includes a receptacle 11 for containing flowers or plants and a releasable clamp 12 that attaches to a pole, such as the vertical umbrella pole often found in patio furniture.

The receptacle 11 holds the flowers or plants in a volume defined by an exterior wall 12 and a closed or bottom end 13. The receptacle 11 has an open or top end 14 and generally the receptacle 11 lies along a receptacle axis 15. The exterior wall can have many shapes. In this particular embodiment the exterior wall 12 defines a frustoconical shape or container with a smooth interior wall 16 and an exterior wall 17 that is sculpted by axially extending flutes. Obviously any other ornamentation could be added to the exterior wall or the exterior wall could even be smooth.

The releasable clamp 12 is integrally molded with the receptacle 11. Preferably the entire structure is molded of a shape memory material that, as known, has a characteristic of allowing a force to deflect a portion of the material into a stressed state. When the force is released, the internal stresses return the material to its original or relaxed state. The selection of a particular shape memory material for a particular application is well within the knowledge of persons of ordinary skill in the injection molding art and therefore is not discussed further in connection with this invention.

As most clearly seen from FIGS. 1 and 2, the releasable clamp 12 has a cross-sectional shape of a C-clamp. This shape is attained by integrally molding two arcuate arms 20 and 21 having a thickness that enables them to deflect outwardly when a force is applied to their respective free ends as the container 10 is attached to a pole. For cylindrical poles, as will be normally encountered in many applications for this container, the arms 20 and 21 will be formed about a cylinder in space. Specifically the arm 20 will have a curved interior surface 22 and will terminate at a free end 23. The arm 21 will include a similar interior surface 24 and free end 25. In this particular embodiment the arms extend essentially radially outwardly from the exterior of the receptacle 11 at the open end 14. It will be apparent that the releasable clamp 12 could be placed at other positions on the exterior of the receptacle 11.

The cylinder defined by the interior surfaces 22 and 23 lies along a clamp axis 26 that parallels an adjacent portion 27 of the exterior of the receptacle 11. The receptacle axis 15 and clamp axis 26 are not parallel in this particular embodiment because the receptacle 11 tapers. However, it will be apparent in other constructions of the receptacle 11 these two axes might be parallel.

Finally, the diameter of the cylinder defined by the interior surfaces 22 and 24 will normally be selected to be slightly less than the table when the arms 20 and 21 are in a fully relaxed state diameter for reasons that will become apparent in the following discussion.

Figure 5A:
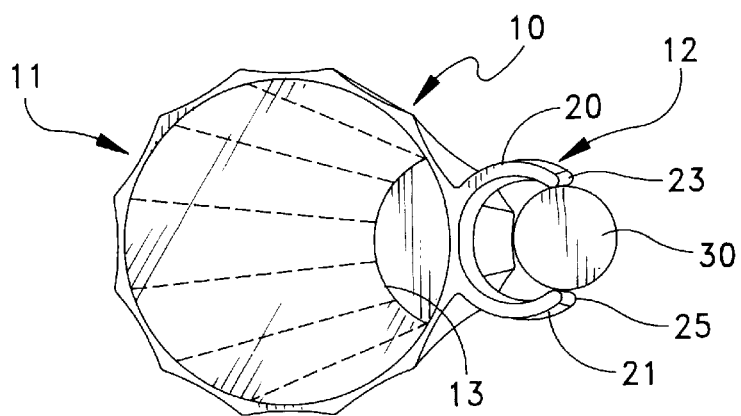
FIGS. 5A and 5B depict the container of FIGS. 1 through 3 partially mounted on a pole.
Figure 5B:
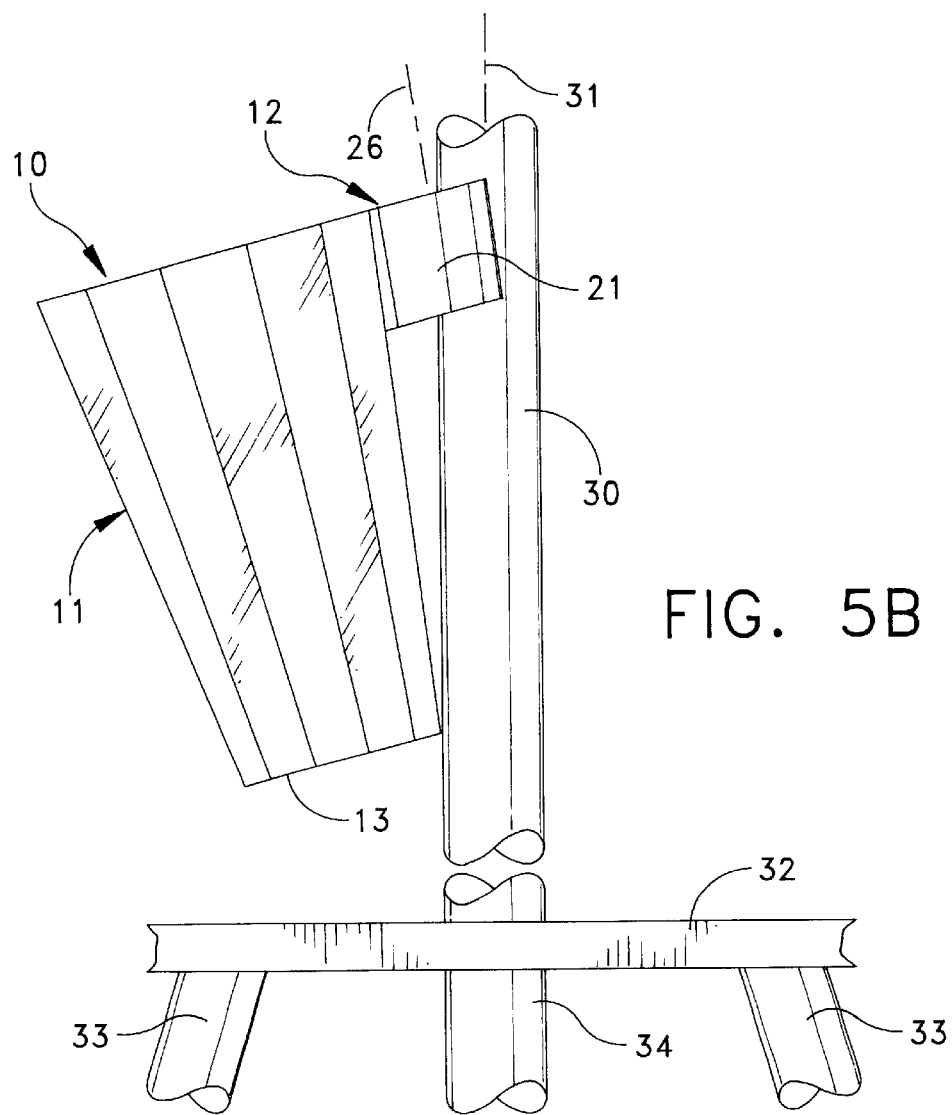
Figure 6A:
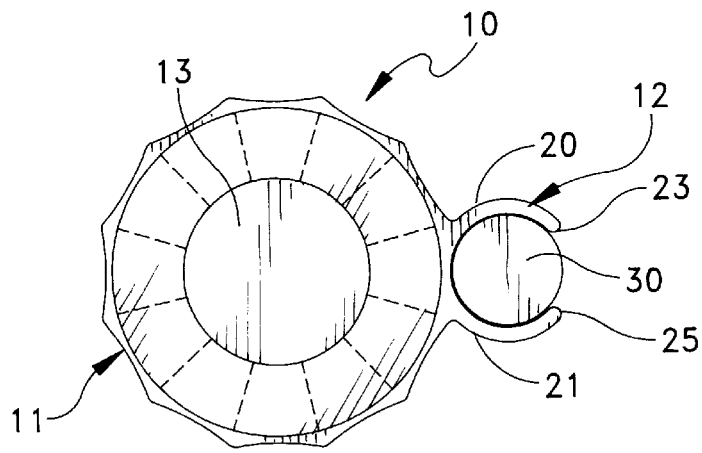
FIGS. 6A and 6B depict the container of FIG. 1 fully mounted on a pole.
Figure 6B:
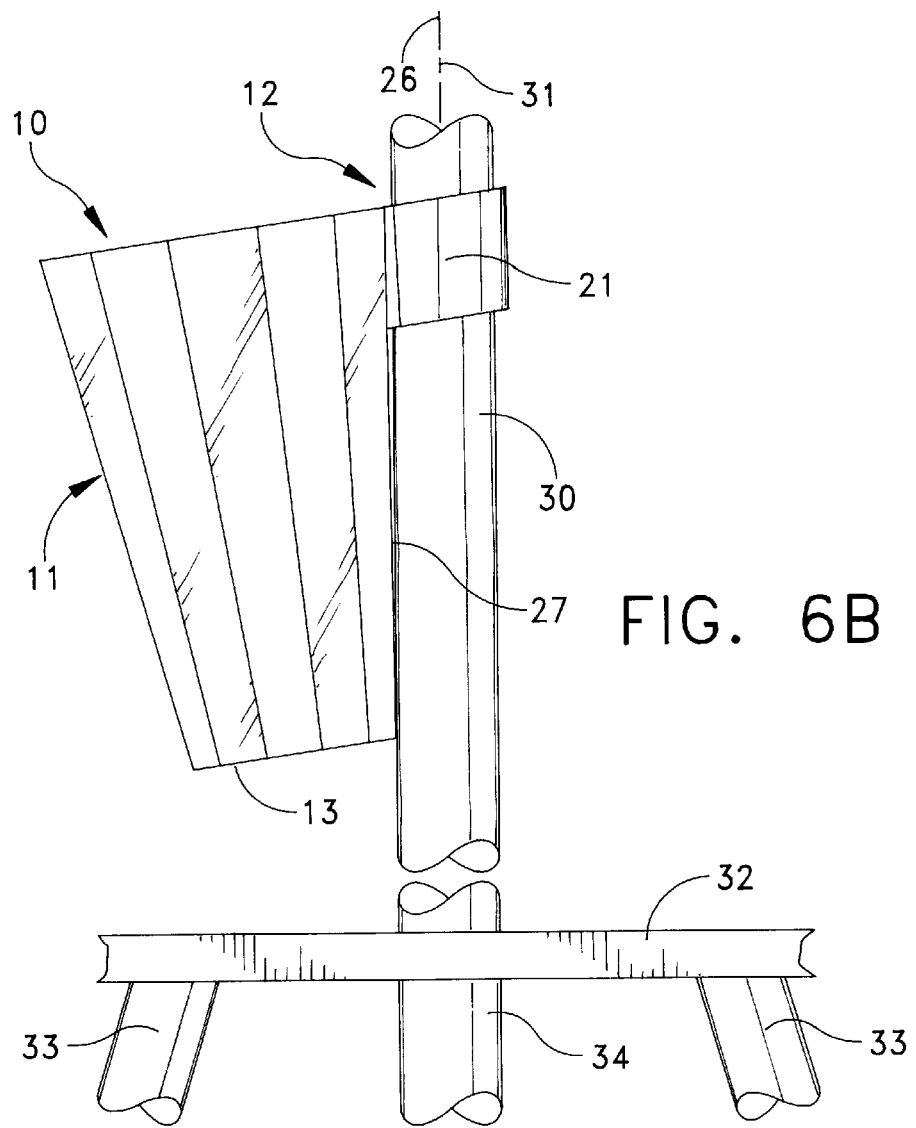

The manner in which the container 10 is applied to a pole can be more clearly seen by referring to the sequence shown in FIGS. 4A through 6B. FIGS. 4B, 5B and 6B particularly show a pole 30 extending along a pole axis 31 from a table with legs 33 and an extension 34 of the pole below the table 32. As will be apparent therefore if the pole 31 supports any structure at its upper end, not shown, such as an umbrella or umbrella attachment fixture, a device having a passage that is closely formed to a mid-section of the pole 30 will not be able to pass over the free ends.

In accordance with this invention, the container 10 is initially positioned against the pole 30 at any intermediate position with an edge of the bottom portion 13 near or abutting the pole 30. The free ends 23 and 25 of the arcuate arms 20 and 21 are proximate the pole 30. In this position the arms 20 and 21 are in a fully relaxed state and the clamp and pole axes 26 and 31 have a maximum displacement.

FIGS. 5A and 5B depict the sequence at a point where lateral forces are produced as by squeezing the container 10 and the pole 30 together. As the pole 30 is rigid in cross-section, the arms 20 and 21 deflect outwardly allowing the free ends of the arms to enlarge the passage between them and to pass by the diameter of the pole. FIGS. 5A and 5B depict a position of maximum deflection. The free ends 23 and 25 of the arms 20 and 21 are located on a diameter of the pole 30.

FIGS. 6A and 6B depict the container 10 at a fully seated position for the releasable clamp 12 with the clamp axis 26 being coaxial with the pole axis. In this position the arms 20 and 21 have returned toward their original position, but as previously described, not to a fully relaxed position. The residual force caused by the displacement of the arms 20 and 21 in the position shown in FIGS. 6A and 6B from their fully relaxed position is sufficient to produce friction that holds the container 10 in place at a selected position on the pole. However, if it is desired to relocate the container 10 on the pole, that friction can be overcome by applying an axial force to the container 10 in an upward or downward direction thereby sliding the container 10 along any unobstructed portions of the pole 30. Alternatively, the container 10 can be removed by a sequence that is the reverse of the FIGS. 4A through 6B and then reattached at another location.

Referring specifically to FIG. 6b the exterior surface 27 of the receptacle lies along the pole 30. As previously indicated, different relationships of the clamp axis 26 and the receptacle axis 15 can produce different angular relationships between the receptacle 11 and a pole 30.

Thus in accordance with this invention a receptacle provides a container for plants. The container is integrally molded for ease of manufacture. It contains a releasable clamp that is easy to use particularly if the releasable clamp is made from a shape memory material because an individual need not manipulate any parts. It is merely necessary to place the container against a vertical pole and squeeze the container against the pole. Thus this invention meets the several objects of this invention because it provides a container that is readily connected to a pole that positions the container in a pole in a secure manner and that is easy to use and manufacture.

This invention has been described in terms of a specific embodiment. A number of variations are possible in the construction of a container that incorporates the features of this invention. Many such alternatives have been previously described. Consequently it is the intent of the appended claims to cover these and any other variations and modifications to the preferred embodiment of this invention that come within the true spirit and scope of the claims.

What is claimed as new and desired to be secured by Letters Patent of the United States is:

1. A container for attachment to a pole comprising:
   a tapering receptacle for holding and displaying decorative objects, said receptacle having an exterior wall, a closed bottom, and an open top, and
   b) a releasable clamp on the exterior of said receptacle, said releasable clamp having a passage therethrough to permit said releasable clamp to past transversely onto the pole and to fix the container at a selected position along the pole; and
   c) wherein said releasable clamp extends from said exterior wall proximate said open top of said receptacle.

2. A container as recited in claim 1 wherein said receptacle is molded and said releasable clamp is integrally molded with said receptacle.

3. A container as recited in claim 1 wherein the pole has a given diameter and wherein said releasable clamp is molded from a shape memory material to form a partially closed structure having a diameter that is less than the given pole diameter, said structure including spaced arms that form the passage, said passage enlarging as said d releasable clamp passes the pole, said structure, when coaxial with the pole contracted to produce sufficient friction to position the container the selected position.

4. A container as recited in claim 1 wherein the pole has a given diameter and wherein said releasable clamp is molded from a shape memory material to form a partially closed structure having a diameter that is less than the given pole diameter, said structure including first and second spaced arcuate arms having space free ends forming a C-clamp about a clamp axis, each of said arms having a thickness that enables them to deflect outwardly when a force is applied to their respective free ends.

5. A container as recited in claim 4 wherein the pole extends along a pole axis, each said arcuate arms having an interior surface for engaging the pole and positioning said container with the clamp axis positioned coaxially with the pole axis.

6. A container as recited in claim 3 wherein said receptacle has a frustoconical shape with a tapered exterior wall, said spaced arms being oriented on said exterior wall with the clamp axis parallel to the adjacent tapered exterior wall.

7. A container for attachment to a vertical pole of a given diameter comprising:

A) a frustoconical receptacle for holding and displaying decorative objects, said receptacle having a closed end and an open end and being bounded by an exterior wall, B) an integrally molded releasable clamp attached to a portion of said receptacle, said clamp having first and second deflectable arcuate arm portions terminating in counterfacing, spaced free ends defining a passage that is narrower than the diameter of the pole thereby to define a C-clamp structure having a diameter that is less than the pole diameter, each of said free ends being deflected to increase the passage size and enable the C-clamp to encompass the pole whereupon said arms return toward their original positions to clamp said container on the pole; and C) where in said receptacle and said arms are molded from a shape memory material and said first and second arms define their respective original positions in a relaxed state, said arms, in that state, lying along a clamp axis that parallels the adjacent exterior portion of said receptacle.

8. A container as recited in claim 7 wherein i) said receptacle has a closed bottom and open top, and ii) said releasable clamp extends from said exterior wall proximate said open top of said receptacle.

9. A container as recited in claim 8 wherein said receptacle has a smooth interior surface and a sculpted exterior surface.

* * * * *

UNITED STATES PATENT AND TRADEMARK OFFICE
CERTIFICATE OF CORRECTION

PATENT NO. : 6,338,419 B1
DATED : January 15, 2002
INVENTOR(S) : Grace S. Penney It is certified that error appears in the above-identified patent and that said Letters Patent is hereby corrected as shown below:

<u>Column 4,</u>
Line 33, "in" should read -- on --.
Line 51, "past" should read -- pass --.
Line 64, "d" should be deleted.
Line 66, "contracted" should read -- contracting --.

<u>Column 6,</u>
Line 11, "where in" should read -- wherein --.

Signed and Sealed this

Twenty-ninth Day of October, 2002

*Attest:*

*Attesting Officer*

JAMES E. ROGAN
*Director of the United States Patent and Trademark Office*